(12) United States Patent
Smith et al.

(10) Patent No.: US 12,245,629 B2
(45) Date of Patent: Mar. 11, 2025

(54) PRODUCT USE AND BEHAVIOR MONITORING INSTRUMENT

(71) Applicant: RAI STRATEGIC HOLDINGS, INC., Winston-Salem, NC (US)

(72) Inventors: Jeffrey Sean Smith, Winston-Salem, NC (US); Paul R. Nelson, Winston-Salem, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 398 days.

(21) Appl. No.: 16/131,785

(22) Filed: Sep. 14, 2018

(65) Prior Publication Data

US 2020/0085097 A1 Mar. 19, 2020

(51) Int. Cl.
*A24F 13/12* (2006.01)
*A24F 47/00* (2020.01)
(Continued)

(52) U.S. Cl.
CPC .............. *A24F 13/12* (2013.01); *A24F 47/00* (2013.01); *G01N 21/534* (2013.01); *H04L 67/1095* (2013.01); *H04L 67/12* (2013.01)

(58) Field of Classification Search
CPC .... A24F 47/008; A24F 47/002; A24F 47/004; A61M 11/00; A61M 15/06; G06F 17/00; G06F 1711/00
(Continued)

(56) References Cited

U.S. PATENT DOCUMENTS 2,974,669 A 3/1961 Ellis
4,627,448 A 12/1986 Kamm et al.
(Continued)

FOREIGN PATENT DOCUMENTS

CN 202364801 U 8/2012
CN 104783331 A 7/2015
(Continued)

OTHER PUBLICATIONS

International Search Report and Written Opinion from corresponding PCT Application No. PCT/US2018/051543, dated Dec. 20, 2018, pp. 1-22.
(Continued)

*Primary Examiner* — Dionne W. Mayes
(74) *Attorney, Agent, or Firm* — BURR & FORMAN LLP

(57) ABSTRACT

A product use and behavior instrument includes a housing defining a central compartment therein. The housing includes a first housing end, a second housing end, and a housing wall. The first housing end defines a combustible smoking article holder configured to receive a combustible smoking article. The second housing end includes a hollow flow member extending from the second housing end in a direction axially away from the first housing end. The controller is positioned within the central compartment of the housing. The controller includes a sensor circuit structured to collect at least one use data characteristic of a smoking action. The smoking action is associated with the use of the combustible smoking article. Local memory is structured to buffer the at least one use data characteristic of the smoking action. A communication interface is structured to communicate to a remote computing device.

22 Claims, 5 Drawing Sheets

(51) Int. Cl.
*G01N 21/53* (2006.01)
*H04L 67/1095* (2022.01)
*H04L 67/12* (2022.01)

(58) Field of Classification Search
USPC .......................................................... 131/178
See application file for complete search history.

(56) References Cited

U.S. PATENT DOCUMENTS

| | | | |
|---|---|---|---|
| 4,714,082 A | 12/1987 | Banerjee et al. | |
| 4,756,318 A | 7/1988 | Clearman et al. | |
| 4,771,381 A * | 9/1988 | Norman et al. | A24C 5/3406 131/330 |
| 4,771,795 A | 9/1988 | White et al. | |
| 4,793,365 A | 12/1988 | Sensabaugh et al. | |
| 4,917,128 A | 4/1990 | Clearman et al. | |
| 4,922,901 A * | 5/1990 | Brooks | A24F 47/006 128/202.27 |
| 4,961,438 A | 10/1990 | Korte | |
| 4,966,171 A | 10/1990 | Serrano et al. | |
| 4,969,476 A | 11/1990 | Bale et al. | |
| 4,991,606 A | 2/1991 | Serrano et al. | |
| 5,020,548 A | 6/1991 | Farrier et al. | |
| 5,033,483 A | 7/1991 | Clearman et al. | |
| 5,040,551 A | 8/1991 | Schlatter et al. | |
| 5,050,621 A | 9/1991 | Creighton et al. | |
| 5,060,671 A | 10/1991 | Counts et al. | |
| 5,065,776 A | 11/1991 | Lawson et al. | |
| 5,076,296 A | 12/1991 | Nystrom et al. | |
| 5,076,297 A | 12/1991 | Farrier et al. | |
| 5,099,861 A | 3/1992 | Clearman et al. | |
| 5,105,835 A | 4/1992 | Drewett et al. | |
| 5,105,837 A | 4/1992 | Barnes et al. | |
| 5,115,820 A | 5/1992 | Hauser et al. | |
| 5,148,821 A | 9/1992 | Best et al. | |
| 5,159,940 A | 11/1992 | Hayward et al. | |
| 5,178,167 A | 1/1993 | Riggs et al. | |
| 5,183,062 A | 2/1993 | Clearman et al. | |
| 5,211,684 A | 5/1993 | Shannon et al. | |
| 5,240,014 A | 8/1993 | Deevi et al. | |
| 5,240,016 A | 8/1993 | Nichols et al. | |
| 5,345,955 A | 9/1994 | Clearman et al. | |
| 5,388,594 A | 2/1995 | Counts et al. | |
| 5,551,451 A | 9/1996 | Riggs et al. | |
| 5,595,577 A | 1/1997 | Bensalem et al. | |
| 5,726,421 A | 3/1998 | Fleischhauer et al. | |
| 5,819,751 A | 10/1998 | Barnes et al. | |
| 6,089,857 A | 7/2000 | Matsuura et al. | |
| 6,095,152 A | 8/2000 | Beven et al. | |
| 6,578,584 B1 | 6/2003 | Beven et al. | |
| 6,730,832 B1 | 5/2004 | Dominguez | |
| 7,290,549 B2 | 11/2007 | Banerjee et al. | |
| 7,481,226 B2 | 1/2009 | Cholet | |
| 7,503,330 B2 | 3/2009 | Borschke et al. | |
| 8,079,371 B2 | 12/2011 | Robinson et al. | |
| 8,402,976 B2 | 3/2013 | Fernando et al. | |
| 8,424,538 B2 | 4/2013 | Thomas et al. | |
| 8,464,726 B2 | 6/2013 | Sebastian et al. | |
| 8,469,035 B2 | 6/2013 | Banerjee et al. | |
| 8,617,263 B2 | 12/2013 | Banerjee et al. | |
| 8,851,081 B2 | 10/2014 | Fernando et al. | |
| 9,016,274 B1 | 4/2015 | White | |
| 9,078,474 B2 | 7/2015 | Thompson | |
| 9,149,072 B2 | 10/2015 | Conner et al. | |
| 9,214,268 B2 | 12/2015 | Difonzo et al. | |
| 9,220,301 B2 | 12/2015 | Banerjee et al. | |
| 9,301,546 B2 | 4/2016 | Thomas et al. | |
| 9,332,784 B2 | 5/2016 | Banerjee et al. | |
| 9,345,268 B2 | 5/2016 | Stone et al. | |
| 9,439,453 B2 | 9/2016 | Conner et al. | |
| 9,486,013 B2 | 11/2016 | Sebastian et al. | |
| 9,788,571 B2 | 10/2017 | Conner et al. | |
| 9,814,268 B2 | 11/2017 | Robinson et al. | |
| 9,839,241 B2 * | 12/2017 | Davidson | A24F 47/008 |
| 9,933,790 B2 * | 4/2018 | Blackley | B01F 3/04 |
| 2004/0031497 A1 * | 2/2004 | Likness | A24F 47/00 131/270 |
| 2004/0177674 A1 | 9/2004 | Read et al. | |
| 2008/0257368 A1 * | 10/2008 | Wilson | A24C 5/3406 131/328 |
| 2011/0265806 A1 | 11/2011 | Alarcon et al. | |
| 2013/0220315 A1 | 8/2013 | Conley et al. | |
| 2013/0255702 A1 | 10/2013 | Griffith et al. | |
| 2013/0255703 A1 | 10/2013 | Banerjee et al. | |
| 2013/0284192 A1 | 10/2013 | Peleg et al. | |
| 2014/0000638 A1 | 1/2014 | Sebastian et al. | |
| 2014/0060554 A1 | 3/2014 | Collett et al. | |
| 2014/0096781 A1 | 4/2014 | Sears et al. | |
| 2014/0096782 A1 | 4/2014 | Ampolini et al. | |
| 2015/0053217 A1 | 2/2015 | Steingraber et al. | |
| 2015/0059780 A1 | 3/2015 | Davis et al. | |
| 2015/0157052 A1 | 6/2015 | Ademe et al. | |
| 2015/0245654 A1 | 9/2015 | Memari et al. | |
| 2015/0335070 A1 | 11/2015 | Sears et al. | |
| 2016/0157524 A1 | 6/2016 | Bowen et al. | |
| 2016/0219938 A1 * | 8/2016 | Mamou | G05D 7/0676 |
| 2016/0302484 A1 * | 10/2016 | Gupta | G01N 15/0205 |
| 2017/0000188 A1 | 1/2017 | Nordskog et al. | |
| 2017/0055576 A1 | 3/2017 | Beeson et al. | |
| 2017/0065000 A1 | 3/2017 | Sears et al. | |
| 2017/0164654 A1 | 6/2017 | Ademe | |
| 2017/0238607 A1 | 8/2017 | Nordskog | |
| 2017/0340008 A1 | 11/2017 | Sebastian et al. | |
| 2018/0289074 A1 | 10/2018 | Tremblay | |
| 2019/0255266 A1 | 8/2019 | Henry et al. | |

FOREIGN PATENT DOCUMENTS

| | | |
|---|---|---|
| FR | 2879746 A1 | 6/2006 |
| TW | 201625057 A | 7/2016 |
| TW | 201815301 A | 5/2018 |
| WO | WO 98/46093 * | 10/1998 |
| WO | WO-98/46093 A1 | 10/1998 |
| WO | WO-02/098245 A1 | 12/2002 |
| WO | WO-2017/023589 A1 | 2/2017 |
| WO | WO-2017/027673 A1 | 2/2017 |

OTHER PUBLICATIONS

U.S. Appl. No. 15/710,681, filed Sep. 20, 2017, Smith et al.
U.S. Appl. No. 15/892,151, filed Feb. 8, 2018, Smith et al.
Non-Final Office Action in U.S. Appl. No. 15/710,681, dated Jun. 27, 2019, 12 pages.
Non-Final Office Action in U.S. Appl. No. 15/892,151, dated Oct. 10, 2019, 20 pages.
International Search Report and Written Opinion in PCT/US2019/050047, dated Dec. 12, 2019, 15 pages.
Final Office Action in U.S. Appl. No. 15/710,681, dated Jan. 6, 2020, 15 pages.
Non-Final Office Action in U.S. Appl. No. 15/892,151, dated Jun. 1, 2020, 22 pages.
International Search Report and Written Opinion of the ISA/EP in PCT/US2020/031329, dated Aug. 6, 2020, 14 pages.
Non-Final Office Action for U.S. Appl. No. 15/892,151, dated Jun. 11, 2021.
Notice of Allowance issued in Taiwanese Application No. 108132442 on Apr. 26, 2024, all enclosed pages cited.

* cited by examiner

PRODUCT USE AND BEHAVIOR MONITORING INSTRUMENT

TECHNICAL FIELD

The present invention relates to tobacco delivery articles and uses thereof for yielding tobacco components or other organic materials (e.g., herbal and non-tobacco cigarettes, cannabis, bidis, etc.) in an inhalable form. The articles may be made or derived from tobacco or otherwise incorporate tobacco for human consumption. More particularly, the present invention relates generally to the field of combustible smoking articles being used with electronic or electrically powered smoking devices.

BACKGROUND

Popular combustible smoking articles, such as cigarettes, have a substantially cylindrical rod shaped structure and include a charge of smokable material, such as shreds of strands of tobacco material (e.g., in cut filler form), surrounded by a paper wrapper, thereby forming a "smokable rod", "tobacco rod" or "cigarette rod." Normally, a cigarette has a cylindrical filter element aligned in an end-to-end relationship with the tobacco rod. Preferably, a filter element comprises plasticized cellulose acetate tow circumscribed by a paper material known as "plug wrap." Typically, a filter element includes cellulose acetate tow circumscribed by plug wrap, and is attached to the tobacco rod using a circumscribing tipping material. The filter element may be attached to one end of the tobacco rod using a circumscribing wrapping material known as "tipping paper." It also has become desirable to perforate the tipping material and plug wrap, in order to provide dilution of drawn mainstream smoke with ambient air. Cigarettes and the various components thereof are discussed, for example, in U.S. Pat. No. 7,503,330 to Borschke et al, which is incorporated herein by reference. A cigarette is employed by a smoker by lighting one end thereof and burning the tobacco rod. The smoker then receives mainstream smoke into his/her mouth by drawing on the opposite end (e.g., the filter end) of the cigarette. Many cigarettes include processed tobacco materials and/or tobacco extracts in order to provide certain flavorful characteristics to those cigarettes. Combustible smoking articles can vary in size, shape, tobacco content, and other smoking features and may be referred to as a cigarette, cigar, pipe tobacco, hooka, and other products that result from the burning of tobacco.

Currently, there are limited options for recording usage of combustible smoking articles and understand how individuals use combustible smoking articles. For example, in clinical trials, most attempts have included the consumer/subject sitting tethered to a traditional topography instrument in a laboratory environment, using video recording of people using a combustible smoking article, or questioning individual users to recall how they used the combustible smoking article. These methods are limiting by constraining the individual user being monitored to a single location. Therefore, the recording and documentation of the usage occurs in relatively "unrealistic" circumstances. In other words, the act of measuring usage impairs how the person uses the combustible smoking article by limiting the individual user to a specific testing location, and not under regular, day-to-day locations and usage. The placement of the topography instrument is between the combustible smoking article and the user. This placement changes how the user uses the product as compared to how they use it naturally. This interference might change the way users use the product during testing and not provide information that accurately represents how the user consumes the product in the real world. Also, using traditional topography the consumer/subject must sit, tethered to the traditional topography instrument in a laboratory environment, further impacting product use and behavior. Accordingly, it would be desirable to provide a device that can be retrofitted onto a variety of smoking articles and can monitor and capture usage of an individual user and the smoking article under normal conditions (e.g., usage by an individual on a day-to-day basis absent monitoring).

SUMMARY

Various example embodiments relate to a product use and behavior instrument and methods of using of such an instrument. According to a first set of embodiments, a product use and behavior instrument includes a housing and a controller. The housing includes a first housing end, a second housing end, and a housing wall. The housing defines a central compartment therein. The first housing end defines a combustible smoking article holder configured to receive a combustible smoking article. The second housing end includes a hollow flow member extending from the second housing end in a direction axially away from the first housing end. The controller is positioned within the central compartment of the housing. The controller includes a sensor circuit structured to collect at least one use data characteristic of a smoking action. The smoking action is associated with the use of the combustible smoking article. Local memory is structured to buffer the at least one use data characteristic of the smoking action. A communication interface is structured to communicate the at least one use data characteristic of the smoking action to a remote computing device.

According to a second set of embodiments, a combustible smoking article assembly is described. The combustible smoking article assembly includes a combustible smoking article and a product use and behavior instrument. The combustible smoking article includes a first end, a second end; and a body extending from the first end axially toward the second end. The body includes a combustible product. The product use and behavior instrument includes a housing and a controller. The housing includes a first housing end, a second housing end, and a housing wall. The housing defines a central compartment therein. The first housing end defines a combustible smoking article holder configured to receive a combustible smoking article. The second housing end includes a hollow flow member extending from the second housing end in a direction axially away from the first housing end. The controller is positioned within the central compartment of the housing. The controller includes a sensor circuit structured to collect at least one use data characteristic of a smoking action. The smoking action is associated with the use of the combustible smoking article. Local memory is structured to buffer the at least one use data characteristic of the smoking action. A communication interface is structured to communicate the at least one use data characteristic of the smoking action to a remote computing device.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings. Exemplary embodiments of the present application will now be described, way of example only, with reference to the accompanying drawings, which are not necessarily drawn to scale, and wherein:

Figure 1:
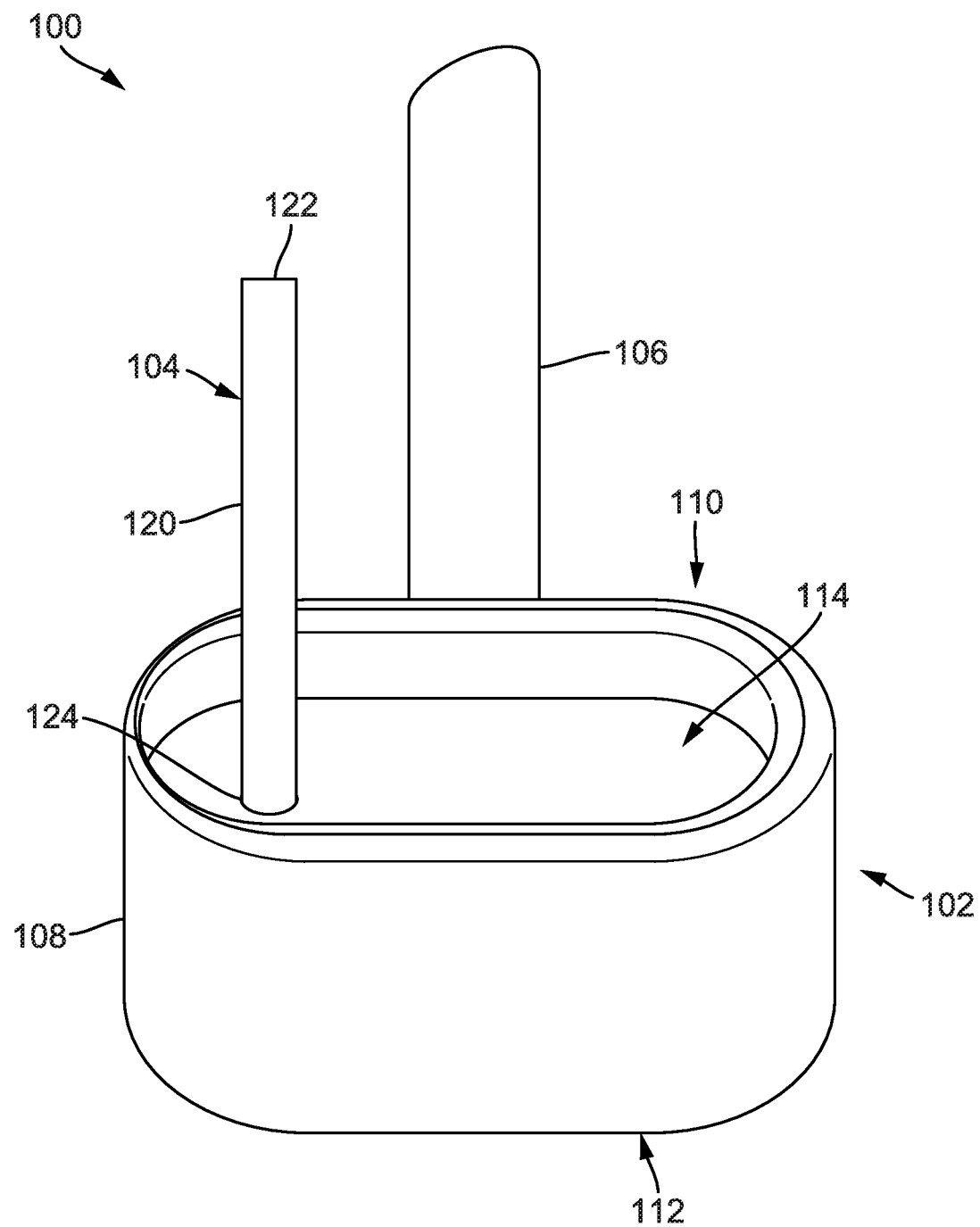
FIG. 1 is a perspective view of a product use and behavior monitoring instrument and combustible smoking article assembly, according to an example embodiment.

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

DETAILED DESCRIPTION

Referring to the figures generally, a product use and behavior for combustible products ("PUB-CB") instrument is described. The PUB-CB instrument is structured to record various aspects of combustible smoking article use including usage by a user (e.g., subject, consumer, etc.) of the combustible smoking article and how the combustible smoking article responds to that use. For example, the PUB-CB instrument can record and measure use characteristics relating to both moment-to-moment use behaviors and patterns of usage across periods of product interaction (e.g., hourly, daily, weekly, etc.). The PUB-CB instrument acquires real-time information related to use characteristics of individual use (e.g., puff) behaviors and how these characteristics change from moment-to-moment. The use behaviors may include number of puffs, duration of a puff, duration between puffs, puff/draw intensity, and other use characteristics. All data are presented in both discrete individual data points and as part of a time/date stamped cumulative record. Additionally, the PUB-CB instrument may monitor and capture location (e.g., global position), orientation of the PUB-CB instrument, movement of the PUB-CB instrument, temperature of airflow leaving the combustible smoking article, and airflow entering combustible smoking article. In some embodiments, the PUB-CB instrument may measure airflow exiting the combustible smoking article as a function of ventilation and/or flow rate.

The PUB-CB instrument components may be encased in a shroud that will allow the unit to record combustible smoking article use with little interference with normal subject/consumer use. By modifying the shroud and the placement and orientation of the combustible smoking article holder (e.g., probe holder), a wide variety of PUB-CB configurations are possible to receive and monitor a wide variety of combustible smoking articles. For example, the shroud of a PUB-CB instrument that is configured to monitor a cigar may have a shroud portion that is substantially cylindrical with a wider mouth end protrusion to mimic the shape of the cigar without a handle portion, thereby allowing the user to have a similar smoking experience to that of just the cigar. Beneficially, the PUB-CB instrument is structured to receive a variety of combustible smoking articles, as it is adaptable to a wide variety of combustible smoking article sizes (e.g., circumference of mouth end) and lengths to accommodate a "real use" experience of the combustible smoking article. The PUB-CB instrument may include features described in U.S. patent application Ser. No. 15/710,681 entitled "PRODUCT USE AND BEHAVIOR MONITORING INSTRUMENT" filed Sep. 20, 2017, which is hereby incorporated by reference mutatis mutandis in its entirety.

Generally, the PUB-CB instrument includes an array of sensors (e.g., sensor array) to record combustible smoking article use characteristics, an on-board memory to store collected data, an on-board rechargeable power source, a wireless (e.g., Bluetooth™) communication interface to transfer data to an external storage location, a receiving end, and a mouth end. Once a PUB-CB instrument receives a combustible smoking article, data monitoring and collection may be triggered by the placement of the combustible smoking article within the PUB-CB instrument, combustion of the combustible smoking article, and/or sensing of air flow through the combustible smoking article.

At the completion of a segment of data acquisition, the PUB-CB instrument may synchronize with a wireless communication-compatible computing device (e.g., desktop, laptop, tablet, smartphone, etc.) and upload the data to a database (e.g., secured or unsecured). The wireless communication may occur over wireless networking and data technologies, such as, for example, IEEE 802.11 or other wireless local area networking technology; a wireless personal area networking technology, such as Bluetooth or other technology using a version of IEEE 802.15 specification; a peer-to-peer or direct connection between devices, such as Wi-Fi direct, infrared (e.g., IrDA); a telecommunications network of a suitable topology (e.g., the internet, intranet, peer-to-peer), using any suitable medium (e.g., wireless, fiber-optic, cellular, cable, telephone) and any suitable communications protocol (e.g., IEEE 802.x, Internet Protocol Suite, near-field communications); and/or tethering to a computing system that communicates using a communication interface (e.g., wired or wireless). In some embodiments, the PUB-CB instrument may synchronize with a wired communication-compatible computing device (e.g., port on a desktop, laptop, tablet, smartphone, etc.) and upload the data to a database. The PUB-CB instrument may include a wired data connection port that is configured to operably connect to a wired data transfer cable to facilitate data transfer over a wired communication. Data may be exportable to a statistical software package for further analysis or to task specific summarization software. As will be appreciated, the PUB-CB instrument may be utilized for clinical and non-clinical research to capture and track use of a combustible smoking article use data for behavioral modeling, to track use, and to provide information about use patterns.

Unlike traditional clinical techniques (e.g., topography), the PUB-CB instrument does not overtly interfere with the normal use and the experience the user has while using the combustible smoking article. The PUB-CB provides a mouth end and a receiving end that minimally interferes with the smoking experience of a combustible smoking article. In some embodiments, the mouth end is configured to mimic the temperature and flow of the mouth end of the combustible smoking article. The PUB-CB may include a handle or similar grip feature to mimic a wide variety of smoking orientations and preference. In some embodiments, a handle on the PUB-CB may be removable to provide a more natural (e.g., closed hand substantially around a circumference) smoking experience. Unlike traditional techniques that constrain a user to a desk or require the user to carry a bulky monitoring device, the PUB-CB is completely portable and allows for the user to use the combustible smoking article in a clinic, laboratory, or ambulatory (anywhere outside of the clinic or laboratory) environment. This increases the likelihood that what the instrument records will be aligned with actual combustible smoking article use characteristics.

Referring to FIG. 1, a perspective view of a PUB-CB system 100 is shown, according to an example embodiment. The PUB-CB system 100 includes a combustible smoking article 104 and a PUB-CB instrument 102. The combustible smoking article 104 includes a first end 122, a second end 124, and a body 120 extending axially from the first end 122 to the second end 124. The first end 122 is a combustible end that is ignited to consume the combustible smoking article 104. The second end 124 is disposed within the PUB-CB instrument 102 and is a mouth end configured to engage the mouth of a user and deliver the aerosol (e.g., smoke) to the user. The combustible smoking article 104 is inserted into PUB-CB instrument to monitor the smoking patterns, behaviors, and other data of the combustible smoking article 104 and user. The PUB-CB instrument 102 has a size and form that is structured to minimally interfere physically with the intended form of the combustible smoking article 104. The components of the PUB-CB instrument 102 ensure that the performance and use of the PUB-CB system 100 substantially similar to the performance and use of the combustible smoking article 104. The combustible smoking article 104 may include tobacco or other organic material, such as herbal and non-tobacco cigarettes, cannabis, or bidis.

The PUB-CB instrument 102 includes a first housing end 110, a second housing end 112, and a housing wall 108 that extends from the first housing end 110 axially toward the second housing end 112. The first housing end 110, second housing end 112, and housing wall 108 are connected to form the housing for the controller 302, described in greater detail below in FIG. 3. The first housing end 110 is configured to receive the combustible smoking article 104. The second housing end 112 is configured to allow the user to inhale the combustible smoking article 104 through the PUB-CB instrument 102. In some embodiments, and as shown in FIG. 1, a handle 106 extends from the housing wall 108 to provide the user a surface to grasp and use the combustible smoking article 104 while it is disposed within the PUB-CB instrument 102. The handle 106 may be a wide variety and shapes to mimic or minimally interfere with the regular smoking experience of the user with the combustible smoking article 104. For example, if the combustible smoking article 104 is loose tobacco (e.g., loose combustible material that could be smoked within a pipe or similar device), the handle 106 may be structured to mimic the handle/shaft of a pipe and orient the PUB-CB system 100 in a manner similar to the weight distribution and orientation of a pipe. The handle 106 may be disposed at a wide variety of locations along the outside surface of the housing wall 108. In some embodiments, the PUB-CB instrument 102 does not include a handle 106 and has a circumferential shape that substantially similar the shape of the portion of a cigarette and/or cigar that is held by a user.

Figure 2A:
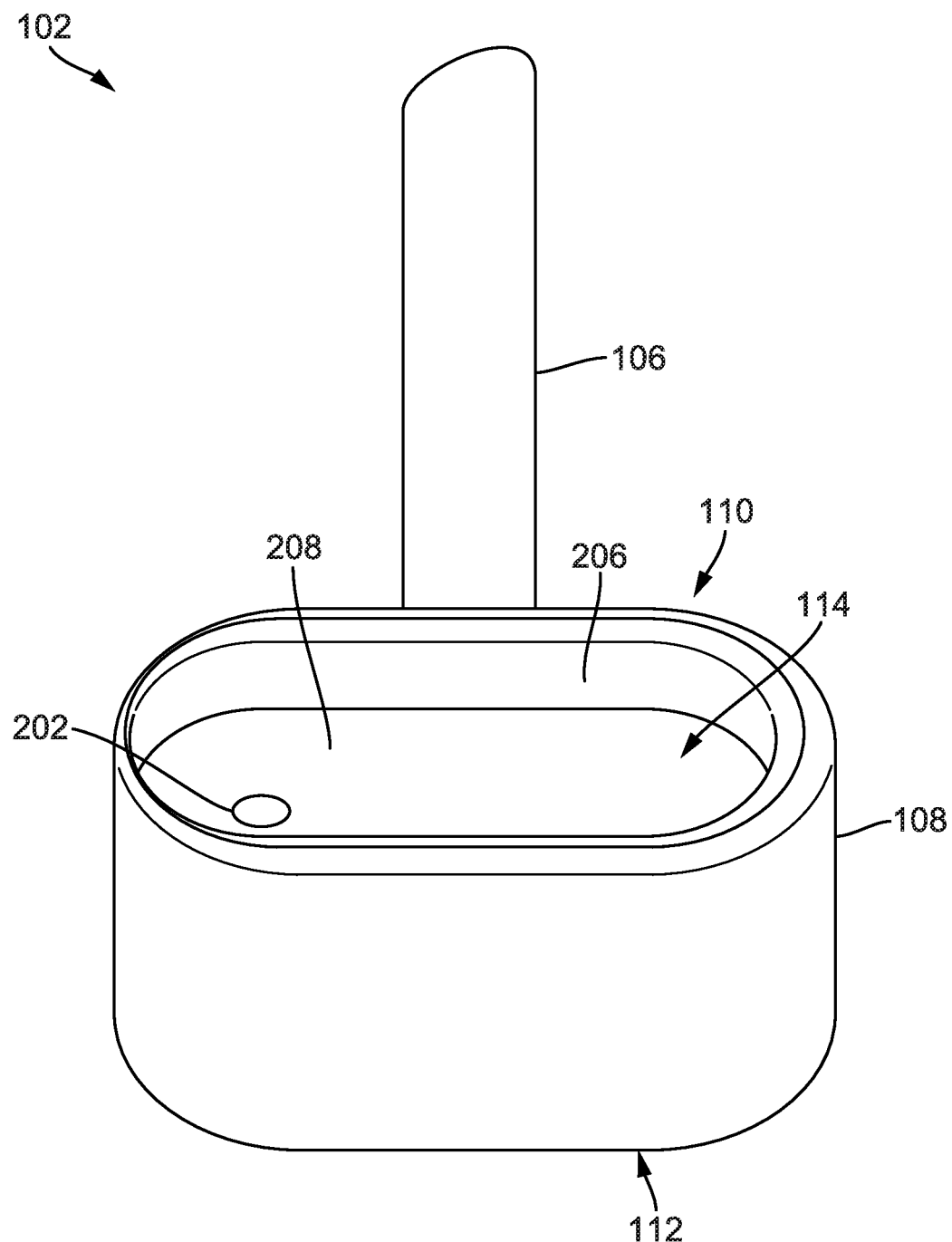
FIG. 2A is a front perspective view of the product use and behavior monitoring instrument of FIG. 1, according to an example embodiment.

Turning to FIG. 2A, a front perspective view of the PUB-CB instrument 102 is shown, according to an example embodiment. As will be appreciated, the PUB-CB instrument 102 does not include a combustible smoking article 104. The first housing end 110 includes a recessed portion 114 that is configured to receive the combustible smoking article 104. The recessed portion 114 includes a shroud wall 206 extending axially from a shroud surface 208 away from the second housing end 112. A combustible smoking article holder 202 is disposed within the shroud surface 208 and is configured to facilitate airflow from the second end 124 of the combustible smoking article 104 through the PUB-CB instrument 102 to the user. The combustible smoking article holder 202 may extend through the PUB-CB instrument 102 toward the mouth end hollow protrusion 204. The combustible smoking article holder 202 is configured to have the size and shape to receive the combustible smoking article 104 and keep the combustible smoking article 104 substantially stable and secure throughout a smoking session. In some embodiments, one or more sensors are disposed within the combustible smoking article holder 202 to monitor one or more aspects of the combustible smoking article 104 and/or smoking experience of the user. In some embodiments, the shroud surface 208 and/or shroud wall 206 are configured to receive loose tobacco or combustible products, similar to a pipe, thereby allowing the user to combust the product and consume the product through the PUB-CB instrument 102.

Figure 2B:
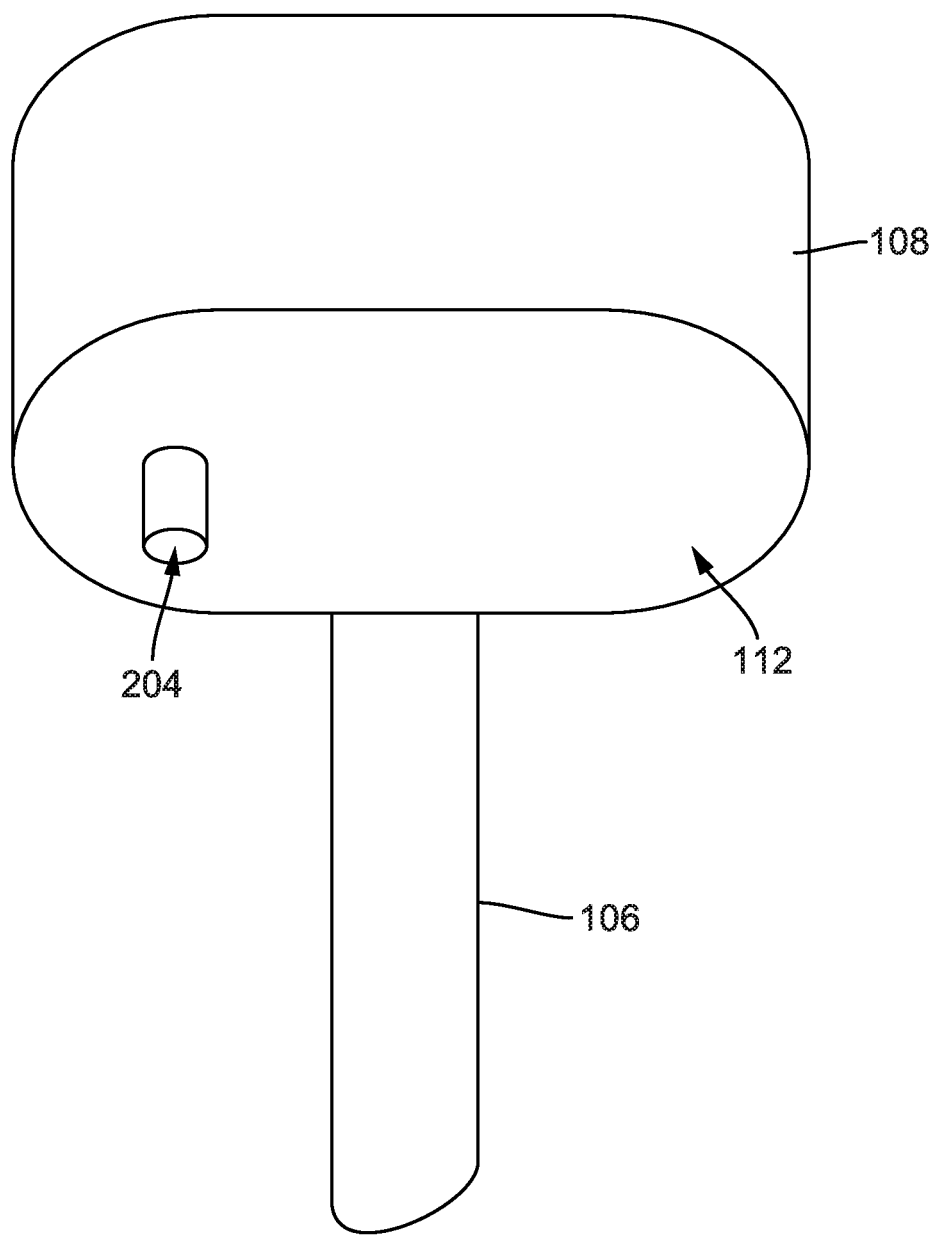
FIG. 2B is a back perspective view of the product use and behavior monitoring instrument of FIG. 2A.

As shown in FIG. 2B, the second housing end 112 includes a mouth end hollow protrusion 204 extending axially away from the second housing end 112. The mouth end hollow protrusion 204 on the PUB-CB instrument 102 allows for the user to breathe into or draw from the combustible smoking article 104, drawing in air through the body 120 of the combustible smoking article 104, through the PUB-CB instrument 102 and, ultimately the mouth end to the user. As will be appreciated, the mouth end hollow protrusion 204 can be disposed in a wide variety of locations along the second housing end 112 to minimize interference with and diminishment of the normal smoking experience of the user. Additionally, the mouth end hollow protrusion 204 may vary in size and air flow restriction to mimic the air flow and mouth end of the combustible smoking article 104. For example, the mouth end hollow protrusion 204 may be wide and configured with internal structures that decrease air flow (e.g., restrict air flow) to mimic a box-pressed cigar placed within the combustible smoking article holder 202.

Figure 3:
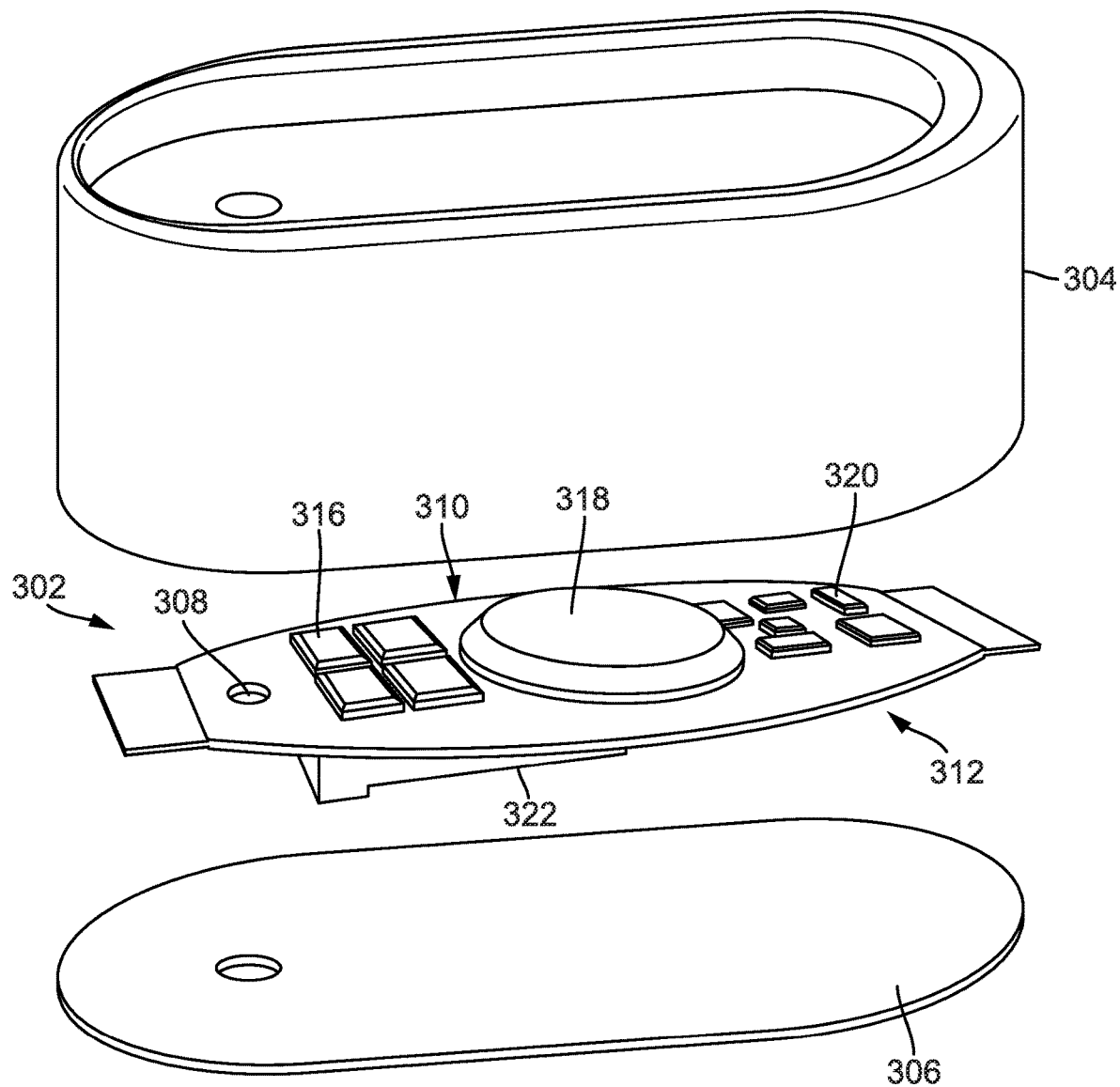
FIG. 3 is a perspective view of an unassembled product use and behavior monitoring instrument, according to an example embodiment.

Referring to FIG. 3, a perspective view of an unassembled PUB-CB instrument 102 is shown, according to an example embodiment. The PUB-CB instrument 102 includes a controller 302 and a housing wall 108. In certain embodiments, the housing wall 108 includes a first outer shroud 304 and a second outer shroud 306. The PUB-CB instrument 102 monitors, records, and transmits a plurality of user usage data and combustible smoking article device data. The PUB-CB instrument 102 is structured to have a form, size, and connectors that allow it to be adapted to interface with-without interfering with the operation of a wide variety of combustible smoking articles (e.g., cigar, cigarette, hand rolled, etc.). As will be appreciated, the PUB-CB instrument 102 may be used in both controlled and limited control environments, under supervision and unsupervised, durable, and in accordance with product safety standards for mobile research equipment.

The controller 302 includes a first end connector 310, a second end connector 312, a sensor array 316, a PUB-CB battery 318, on-board memory 320, and an communication interface 322. A flow orifice 308 is defined within the controller 302 and structured to facilitate air flow from the combustible smoking article 104 in the combustible smoking article holder 202, through the PUB-CB instrument 102, to the mouth end hollow protrusion 204. As will be appreciated, the flow orifice 308 may be specifically configured to accommodate the heat and combustible nature of the combustible smoking article 104 inserted into the combustible smoking article holder 202. Further, the controller 302 may have a wide variety of orientations of the various feature to accommodate the air flow and heat from the combustible smoking article 104 in the combustible smoking article holder 202. For example, the flow orifice 308 may be disposed in-line with the combustible smoking article holder 202 such that there is minimized interference with the draw of the smoke from the combustible smoking article 104 through the mouth end hollow protrusion 204 to the user. In some embodiments, the flow orifice 308 and/or mouth end hollow protrusion 204 are structured to provide replicability of use and similarity to use of the mouth end of the combustible smoking article 104. In some embodiments, the flow orifice 308 and/or mouth end hollow protrusion 204 are structured to be cleanable to provide a pleasant smoking experience during each use. In some embodiments, the flow orifice 308 and/or mouth end hollow protrusion 204 may be coated or impregnating with a bacterial and/or microbial inhibitor. As will be appreciated, the controller 302 may include a vertical protrusion that includes one or more components in order to accommodate various size, shapes, temperatures, and other feature of combustible smoking articles 104.

The controller 302 is structured to monitor, record, and store a plurality of data and characteristics of the user and combustible smoking article. The controller 302 is structured to have a size and connectors that will interface with a wide variety of combustible smoking article and interfere as little as physically possible with the intended form of a combustible smoking article. The controller 302 acquires real-time data related to characteristics of individual puff behaviors (e.g., number, duration, inter-puff intervals), change in puff characteristics from moment to moment, change in puff characteristics over a duration of time, and similar information. For example, captured puffing characteristics could include, but is not limited to, puff volume (ml), puff duration (s), number of puffs, number of sub-puffs, mean and peak flow (ml/s), mean and peak draft (ml/s), mean and peak resistance, mean and peak pressure drop (mmWg), inter puff interval (s), and time lit (s). The controller 302 may also acquire location of the user (e.g., global position system ("GPS")), orientation of the combustible smoking article 104 and/or PUB-CB, movement of instrument, temperature of airflow exiting the mouth end of 124 the combustible smoking article 104, and pressure of airflow exiting combustible smoking article 104. In some embodiments, the PUB-CB instrument 102 may include a built-in GPS location module (e.g., a GPS or other satellite navigation receiver) configured to acquire the location of the PUB-CB instrument 102. Alternatively, in some embodiments, the controller 302 of the PUB-CB instrument 102 may be configured to acquire an approximate location of the PUB-CB instrument 102 by obtaining the location of a second device in proximity to the PUB-CB instrument 102, such as a smart phone or other mobile computing device. The PUB-CB instrument 102 may be configured to be in communication with the mobile computing device when in proximity with the PUB-CB instrument 102. As still a further example, the PUB-CB instrument 102 of some embodiments may be configured to obtain an approximate position of the PUB-CB instrument 102 from a cellular phone tower(s), wireless local area network access point, and/or the like that is within range of the PUB-CB instrument 102. The controller 302 facilitates the storage of the data characteristics relating to moment-to-moment user use behaviors and patterns of usage across bouts of product interaction (e.g., hourly, daily, weekly). The controller 302, and associated elements, can be physically implemented on a circuit board.

The first outer shroud 304 includes a receiving element structured to removably couple to and receive a second end 124 (e.g., mouth end) of the combustible smoking article 104. The first outer shroud 304 may vary in size to accommodate a variety of a combustible smoking article 104 that have different sizes (e.g., circumferences, lengths, etc.) and shapes. In some embodiments, one or more PUB-CB instruments 102 (e.g., modules) may be used in a single combustible smoking article. In those embodiments, the first outer shroud 304 may be structured to couple with another module PUB-CB instrument 102. As will be appreciated, the size and type of coupling element of the first outer shroud 304 is dependent upon the components that comprise the interior of a specific combustible smoking article.

The second outer shroud 306 includes a mouth end hollow protrusion 204 that is configured to simulate the smoking experience of the combustible smoking article 104 being monitored. The mouth end hollow protrusion 204 may vary in size to accommodate a variety of a combustible smoking article 104 that have different sizes (e.g., circumferences, lengths, etc.) and shapes. For example, a PUB-CB instrument 102 that is configured to receive a cigar may have a mouth end hollow protrusion 204 that is wider and cut (e.g., press, box, etc.) to match the mouth end of the cigar. In some embodiments, the mouth end hollow protrusion 204 is adjustable to one or more configurations to emulate different combustible smoking articles 104. In some embodiments, one or more PUB-CB instruments 102 (e.g., modules) may be used in a single combustible smoking article. In those embodiments, the second outer shroud 306 may be structured to couple with another PUB-CB instrument 102. As will be appreciated, the size and type of coupling element of the second outer shroud 306 is dependent upon the components that comprise the interior of a specific combustible smoking article.

The on-board memory 320 is structured to store data and characteristics collected by the sensor array 316. The on-board memory 320 may be flash memory or electrically erasable programmable read-only memory ("EPROM") memory. The on-board memory 320 should provide sufficient memory capacity to allow storage of the highest estimated data load generated over a set period, for example, a seven-day period. In some embodiments, the on-board memory 320 may be reset to null values and the on-board clock resynced once data is upload. In other embodiments, the on-board memory 320 is structured to maintain all data until the on-board memory 320 reaches capacity. The on-board memory 320 may store data (e.g., raw data format, processed data format, encrypted data format, etc.), and time and date stamp the data, thereby allowing for subsequent use of the data to determine flow values. As will be appreciated, the flow values coupled with puff duration values may be used to generate a Total Particulate Matter ("TPM") constant for the estimated mouth-level exposure ("eMLE") of the aerosol measure or the particulate matter density. The data captured by the sensor array 316 is stored in the on-board memory 320 in both discrete individual data points and as part of a time and date-stamped cumulative record.

The PUB-CB battery 318 includes an on-board battery 318, one or more capacitors configured to store electrical energy, and/or other similar power source that may be configured to at least temporarily store energy and supply stored energy for operation of the PUB-CB instrument 102. The PUB-CB battery 318 may also be a rechargeable battery, for example at least one capacitor that can be recharged. In some embodiments, the rechargeable battery is charged and/or powered via solar power. The PUB-CB battery 318 may be a solid state battery. The PUB-CB battery 318 should be able to maintain a charge throughout the highest estimated level of subject use. In some embodiments, the PUB-CB battery 318 will last for at least seven days without having to be re-charged. In some embodiments, the PUB-CB instrument 102 includes a charging port on the housing wall 108 that can charge the PUB-CB battery 318. In some embodiments, the PUB-CB battery 318 is stored separate from the controller 302, for example in the handle 106. In such embodiments, the PUB-CB battery 318 is operably connected to controller 302 to provide power to the components. The handle 106 may include a charging port located on an outer surface that can charge the PUB-CB battery 318.

The communication interface 322 is structured to transmit data collected by the sensor array 316 and stored by the on-board memory 320. The communication interface 322 may be an antenna, transmitter, physical data cable interface, and/or other devices or elements that support of facilitate the communication of data. The communication interface 322 may be structured to upload data during the charging cycle of the combustible smoking article, during activation of the combustible smoking article device, continuously throughout the lifecycle of the combustible smoking article, or similar triggering events. In some embodiments, the data is temporarily buffered within the on-board memory 320 until the data is sent via the communication interface 322 and/or stored within memory. In some embodiments, the on-board memory 320 may be reset to null values and the on-board clock resynced once the data upload by the communication interface 322 concludes. In some embodiments, the PUB-CB instrument 102 uses Bluetooth™ technology to facilitate the transfer of data from the memory of the PUB-CB instrument 102 to a secured location (e.g., a server location) through data transfer software (e.g., PC, iOS™, or Android™). With the transmission of the data over a wired or wireless communication, the communication interface 322 is designed to limit interfere with the aerosol generated as much as possible. In other embodiments, the communication interface 322 has a wired interface that allows for a wired connection to a secured or unsecured location through the data transfer software. In some embodiments, data security and integrity during migration from the communication interface 322 of the PUB-CB instrument 102 to the computer or smart device, to the database server are maintained according to appropriate research data standards. In other embodiments, data transfer is to a public or personal database. In some embodiments, the data hosted in the secure database may be used to communicate with the PC and/or Smart Device (Smartphone and/or Tablet) to present additional information to the user of the PUB-CB instrument 102.

The sensor array 316 is structured to monitor and record one or more data characteristics of the combustible smoking article and the user usage data. The sensor array 316 is structured to monitor and record a wide variety of user usage characteristics and data. The sensor array 316 can capture real-time data related to characteristics of individual use behaviors (e.g., number, duration, inter-puff intervals), how these characteristics change from moment to moment, and how the performance of the combustible smoking article 104 changes from moment to moment. The sensor array 316 may measure the time between when a puff is concluded (e.g., temperature change in the flow orifice 308) and the initiation of the next puff (e.g., temperature change in the flow orifice 308), also known as the inter-puff-interval ("IPI"). As will be appreciated, the puff statistics captured by the sensor array 316 can be used to capture puff, rapid-puffs, and sub-puff counts and duration values as well as IPI counts and duration values. A rapid-puff may comprise quick puffs in rapid succession, for example to increase airflow and combustion of the combustible smoking article. A sub-puff may include an inhalation that is less than the full inhalation. As will be appreciated, the data captured by the sensor array 316 is stored in the on-board memory 320 in both discrete individual data points and as part of a time and date-stamped cumulative record.

As discussed in greater detail below, the sensor array 316 may capture a view variety of discrete PUB-CB elements such as: puff duration, inter puff interval, number of puffs, mean puff duration, mean rest duration, mean number of puffs, sub-puff, rapid-puff, puff volume, mean flow rate, peak flow rate, mean draft, peak draft, mean resistance, peak resistance, mean pressure drop, peak pressure drop, temperature (throughout use), physical pressure, and/or aerosol characteristics (e.g., optical density). The sensor array 316 may capture a view variety of PUB-CB rate and pattern variables such as: rate per session, rate per day, rate across lifecycle of the test, number of sessions per day, pattern of puffs (e.g., latency or rate) per session, rate or pattern of non-use or inactivity. As will be appreciated, a "session" may be the ignition of the combustible smoking article 104 to the extinguishment of the combustible smoking article 104. In some embodiments, the session run from the placement of the combustible smoking article 104 into the PUB-CB instrument 102 to the removal of the combustible smoking article 104 from the PUB-CB instrument 102. The sensor array 316 may capture particulate matter density such as tar (e.g., non-vapor portion, optical tar, tar mass, optical tar mass).

In some embodiments, the sensor array 316 includes hardware sensors that track the position of the combustible smoking article while being used. For example, a 9-axis gyroscope is used to capture the orientation of the PUB-CB instrument 102, an accelerometer to capture the movement of the PUB-CB instrument 102, and/or a GPS to capture the location of the PUB-CB instrument 102. In such embodiments, the position tracker(s) can be used to generate data concerning the location of the combustible smoking article in regards to the location relationship between the first outer shroud 304 and the second outer shroud 306. Beneficially, recording this location relationship allows for the researchers to determine how the user was holding the combustible smoking article while performing a puff.

The sensor array 316 may include hardware sensors that detect changes in the ambient temperature within airway ports of the PUB-CB instrument 102 or the combustible smoking article 104. The temperature changes may be used to identify when a puff is initiated and ongoing use of the combustible smoking article. In some embodiments, the sensor array 316 may include a temperature sensor operably connected to the combustible smoking article holder 202, the flow orifice 308, and/or the mouth end hollow protrusion 204 to monitor for an increase in temperature at the location of the sensor to identify the beginning of a smoking session.

In some embodiments, the PUB-CB instrument 102 may include hardware sensors that detect the speed of movement of the PUB-CB instrument 102 from one position to another. In some such embodiments, linear acceleration of the PUB-CB instrument 102 is measured in relation to use/non-use to identify the beginning of a period of product use. In such embodiments, the use of passive acoustic measurements may provide information to understand puff velocity and the general shape of individual puff characteristics.

The sensor array 316 may be operably connected to one or more additional light emitting or LED sensors to determine aerosol density (also referred to as tar or optical tar) and other aerosol-related and product use characteristics. The sensors may include an LED and detector to evaluate the density of an aerosol passing through the PUB-CB instrument 102. In some embodiments, when there is no aerosol, the detector will capture all of the energy the LED produces. In some embodiments, the LED sensors determine aerosol density and other aerosol-related and product use characteristics. Accordingly, as density of the aerosol increases, more energy is blocked from detection. Tar values can be used as an estimate of nicotine-free, dry particulate matter yield of the combustible smoking article 104. In some embodiments, a fiber optic may be used as the light emitting source used to evaluate the density of an aerosol passing through the PUB-CB instrument 102. As will be appreciated, a wide variety of light emitting sources may be used that are structured to have a size and shape to be utilized in the PUB-CB instrument 102.

The sensor array 316 may include a pressure sensor operably connected to flow orifice 308 and/or combustible smoking article holder 202. The pressure sensor may be configured to detect the presence of the combustible smoking article 104 and begin the data acquisition session. For example, the insertion of a cigarette rod into the combustible smoking article holder 202 of some embodiments triggers the pressure sensor and identifies the presence of the combustible smoking article 104. In some embodiments, the pressure sensor is configured to monitor an increase of air flow through the flow orifice 308, combustible smoking article holder 202, and/or mouth end hollow protrusion 204 to identify when a session is active. The pressure sensor of some embodiments is configured to detect when the combustible smoking article 104 is removed from the combustible smoking article holder 202, thereby signaling the end of the data acquisition session.

The PUB-CB instrument 102 may also include hardware sensors that track and record events measured by other components that make up the PUB-CB instrument 102. Beneficially, this tracking is date and time stamped such that all recorded events form a cumulative record. The cumulative record is trackable and exportable to any statistical software package for further analysis or to task specific summarization software. In other embodiments, the PUB-CB instrument 102 may include a photo-, mechanical-, and/or pressure sensor that will detect if the combustible smoking article 104 has been removed from the PUB-CB instrument PUB-CB instrument 102.

In some embodiments, the PUB-CB instrument 102 includes a toggle function on the controller 302. The toggle function can turn on, turn off, limit, or alter one or more data characteristics monitoring and recorded by the PUB-CB instrument 102. For example, the toggle function may limit the total puffs generated (e.g., in terms of duration, number, or a combination of both) over a specific period of time (e.g., minutes/hours/days/weeks, etc.) in order to limit the number of uses of the combustible smoking article. In other embodiments, the PUB-CB instrument 102 includes a single activation button that can be used to trigger or mark events (e.g., date/time/location) that occur during the course of usage of the combustible smoking article. In some embodiments, the PUB-CB instrument 102 includes a screen (e.g., LCD, OLED, etc.), on a surface of the housing wall 108. The screen may display the status of any of the events that the PUB-CB instrument 102 records or manages. The screen may also facilitate the user to adjust the data the sensor array monitors and records, for example through the toggle function. The user may use the screen to select an "off" option for one or more data characteristics collected, for example, location of the user throughout usage of the PUB-CB instrument 102. In some embodiments, the screen may be a touch-screen that allows the user to touch the display to select different options and/or criteria of the PUB-CB instrument 102.

A PUB-CB instrument 102 may also include an identifier related to the structure and characteristics of the PUB-CB instrument 102. As will be appreciated, this would allow a user to switch between a clinical (e.g., data captured for a third party's analysis) or non-clinical (e.g., data captured for the user's analysis) study. The identifier can be incorporated into the data set to allow for alignment of data type (e.g., clinical, non-clinical, specific user, PUB-CB instrument 102 type) to a data source. The data source may be associated with the type of combustible smoking article 104 used (e.g., cigarette, cigar, etc.) in the PUB-CB instrument 102. Additionally, the identifiers may be encoded into the PUB-CB instrument 102 and visually apparent through an embossed portion of—or affixed by label to—the housing wall 108 of the PUB-CB instrument 102.

In some embodiments, the sensor array 316 may include an access control through biometric security sensor such as, for example, a fingerprint sensor to detect fingerprint characteristics. In those embodiments, the use of the combustible smoking article and/or the data characteristic collection may only occur is the fingerprint sensor captures a fingerprint from an authorized user (e.g., associated with the PUB-CB instrument). In some embodiments, the access control may include a PIN code, providing biometric information/data (e.g., iris, gait, voice, etc.). In some embodiments, the PUB-CB instrument PUB-CB instrument 102 may wireless query the surrounding area (e.g., checking via Bluetooth™) for the presence of a known (e.g., authorized) computing device or other computing device associated with authorized user such that the PUB-CB instrument PUB-CB instrument 102 may only captures data if used in proximity to the authorized device.

In certain embodiments, the PUB-CB instrument 102 is configured as a series of modules. A single module PUB-CB instrument may be structured to monitor and record a single or multiple data or characteristics. Multiple module PUB-CB instruments 102 may be connected along the combustible smoking article to monitor and record a single or multiple data or characteristics. As will be appreciated, with module PUB-CB instruments, a combustible smoking article can be tailored to capture a specific subset of data and characteristics. For example, a user may want to utilize the PUB-CB instrument 102 to capture data characteristics, but not allow the transmission or capture of any location data. Therefore, the user's combustible smoking article could include multiple module PUB-CB instruments 102 that monitor and record data or characteristics unrelated to location. In some embodiments, the PUB-CB instrument 102 includes a chip that is structured to interface on a combustible smoking article and collect least one use data characteristic.

As will be appreciated, data collected by the sensor array 316 can be input into a graphical-based software program for summary and pattern recognition of combustible smoking article use over specific periods of time. The software may import raw data exported from database on a per-user/per-trial basis. The data may be processed for summarizing and applying algorithms for computing discrete product use elements, product use rate and/or patterns, and the particulate matter measure. Within the software program, information associated with the specific combustible smoking article under evaluation (e.g., TPM data values) needed to perform analytics is modifiable. Data generated by this process may be uploaded to the PUB-CB instrument 102 database. As will be appreciated, data imported and results exported meet standards for data security and integrity. In other embodiments, the data collected by the sensor array 316 is sent to a task specific summarization software.

Figure 4:
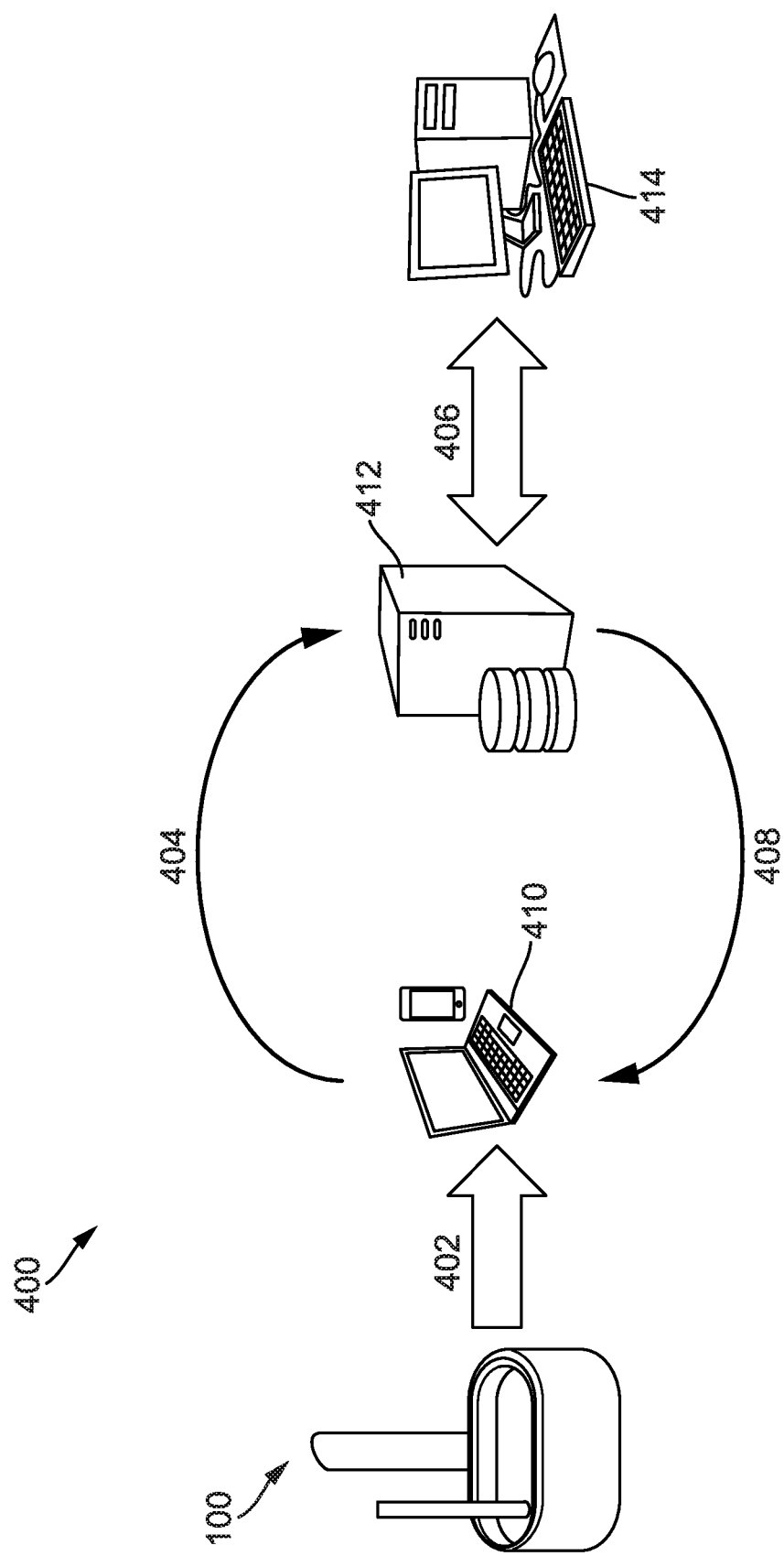
FIG. 4 is a schematic flow diagram illustrating a method for transmitting data from a combustible smoking article with a product use and behavior monitoring instrument, according to an example embodiment.

Referring to FIG. 4, a schematic flow diagram illustrating a method 400 for transmitting data from a PUB-CB system 100 is shown, according to an example embodiment. The method 400 is described in connection with recorded data on a PUB-CB system 100 being synced to a user computing system 410 (e.g., laptop, tablet, desktop, mobile computing device, etc.), a server system 412 (e.g., secure database, unsecure database, cloud storage, etc.), and/or a clinical computing system 414. As will be appreciated, data and results exported and imported meets the standards for clinical data security and integrity. In some embodiments, the PUB-CB system 100 may synchronize with only one of the user computing system 410, the server system 412, and the clinical computing system 414, and in some such embodiments, the other computing systems may synchronize with each other.

The method 400 begins at 402 with the PUB-CB system 100 synchronizing data stored on the on-board memory 320 of the PUB-CB system 100 to a user computing system 410 associated with the user. The data synchronization can occur using the communication interface 322 of the PUB-CB instrument 102. The data synchronization can be triggered, for example, by the charging cycle of a component of the PUB-CB system 100, during activation of the PUB-CB system 100, continuously throughout the lifecycle of the PUB-CB system 100, or a similar triggering event. In some embodiments, the PUB-CB system 100 uses Bluetooth™ technology or other wireless communication to facilitate the transfer of data from the memory of the PUB-CB system 100 to the user computing system 410 through data transfer software (e.g., PC, iOS™, Android™, mobile operating systems, etc.). In other embodiments, the PUB-CB system 100 has a wired interface that allows for a wired connection to the user computing system 410 through the data transfer software.

The data synchronization may include data related to moment-to-moment use behaviors and patterns of usage behaviors across periods of product interaction (e.g., hourly, daily, weekly) by the user. The PUB-CB system 100 acquires real-time data related to characteristics of individual use (puff) behaviors (e.g., number, duration, inter-puff intervals), how these characteristics change from moment to moment, and how flow, temperature, and/or other combustible characteristics change moment to moment. In some embodiments, the conclusion of the data synchronization causes the data stored on the on-board memory 320 to be reset to null values and the on-board clock to be resynced.

At 404, the data transferred from the user computing system 410 is transferred to the server system 412 over the network. The network may include, for example, the Internet, cellular networks, proprietary cloud networks, and similar infrastructures. In some embodiments, the transfer is maintained according to appropriate research data standards. In some embodiments, the PUB-CB system 100 may transfer data directly to a cloud interface, bypassing one or more intermediary computing systems.

At 406, the data stored on the server system 412 is accessed by a clinical computing system 414. One or more clinical computing system 414 may have access to secure data on the server system 412. As will be appreciated, data accessed by the clinical computing system 414 can be input into a graphical-based software program for summary and pattern recognition of combustible smoking article 104 use over specific periods of time. The software may import raw data exported from database on a per-user/per-trial basis. The data may be processed for summarizing and applying algorithms for computing discrete product use elements, product use rate and/or patterns, and the particulate matter density. Within the software program, information associated with the specific combustible smoking article 104 under evaluation (e.g., TPM data values) needed to perform analytics is modifiable. Data generated by this process may be uploaded both onto the server system 412. In some embodiments, the data is uploaded to United States Food and Drug Administration ("FDA") compliant and secure database.

In some embodiments, the data hosted in the server system 412 may be used to communicate 408 with the user computing system 410 to present additional information to the PUB-CB system 100. Such information may comprise, for example, software updates for the PUB-CB instrument 102, security updates for data transfer and storage, alteration of functions, addition of functions, data presentation to the user, statistics of user usage, additional control functions, authorized user updates, data storage updates, etc. For example, to cause the PUB-CB system 100 to monitor and capture data related to a specific characteristic. In some embodiments, the data may be used to generate a user interface that provides information and feedback to the user regarding combustible smoking article product use, behavioral monitoring, consumption statistics, and other combustible smoking article related data and patterns.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, while multiple embodiments describe various dimensions and connections of the PUB-CB instrument, it is anticipated that the PUB-CB instrument may have a connection cross-section of a wide variety of target shapes and sizes.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The computer readable program code (e.g., identification code) embodied on a processing circuit may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

The communication interfaces may include, for example, an antenna (or multiple antennas) and supporting hardware and/or software for enabling wireless communication with a communication network (e.g., a cellular network, Wi-Fi, WLAN, and/or the like), and/or for supporting device-to-device, short-range communication, in accordance with a desired communication technology. Examples of suitable short-range communication technologies that may be supported by the communication interface include various near field communication (NFC) technologies, wireless personal area network (WPAN) technologies and the like. More particular examples of suitable WPAN technologies include those specified by IEEE 802.15 standards or otherwise, including Bluetooth, Bluetooth low energy (Bluetooth LE), ZigBee, infrared (e.g., IrDA), radio-frequency identification (RFID), Wireless USB and the like. Yet other examples of suitable short-range communication technologies include Wi-Fi Direct, as well as certain other technologies based on or specified by IEEE 802.11 standards and that support direct device-to-device communication.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

What is claimed is:

1. A product use and behavior instrument comprising:
   a housing comprising a first housing end defining an integral combustible smoking article holder configured to receive a combustible smoking article, and the housing comprising a second housing end comprising a hollow flow member; and
   a controller positioned within the housing, the controller comprising:
      a sensor circuit caused to collect at least one use data characteristic of a smoking action, wherein the smoking action is associated with use of the combustible smoking article;
      local memory structured to buffer the at least one use data characteristic of the smoking action; and
      a communication interface structured to communicate the at least one use data characteristic of the smoking action to a remote computing device,
   wherein the first housing end of the housing further defines a recessed portion including a shroud comprising a shroud surface and a shroud wall, the shroud wall extending axially away from the second housing end and the shroud surface, the shroud configured to receive a loose combustible smoking material, and wherein the combustible smoking article holder is disposed within the shroud surface.

2. The product use and behavior instrument of claim 1, further comprising a holder extending from the housing.

3. The product use and behavior instrument of claim 1, wherein the controller defines a flow orifice extending through the controller, the flow orifice configured to place the combustible smoking article holder in fluid communication with the hollow flow member, and thereby facilitate air flow from the combustible smoking article holder to the hollow flow member.

4. The product use and behavior instrument of claim 3, wherein the controller further comprises a light emitting diode and detector, the light emitting diode disposed on an a first side of the flow orifice and the detector disposed on a second side of the flow orifice, the detector configured to capture light from the light emitting diode such that the light captured is associated with a density of aerosol flowing through the flow orifice.

5. The product use and behavior instrument of claim 1, wherein the at least one use data characteristic of the smoking action includes an activity component and a time component.

6. The product use and behavior instrument of claim 5, wherein the activity component comprises at least one of puff number, puff duration, or inter-puff interval,
and wherein the time component comprises at least one of activity time, activity duration, or activity period.

7. The product use and behavior instrument of claim 5, wherein the activity component comprises at least one of orientation, temperature of air flow, or air flow pressure, and
wherein the time component comprises at least one of activity time, activity duration, or activity period.

8. The product use and behavior instrument of claim 1, wherein the sensor circuit is configured to begin capturing the at least one use data characteristic of the smoking action upon detection of a change in ambient temperature within the product use and behavior instrument.

9. The product use and behavior instrument of claim 1, wherein the controller further comprises a fingerprint sensor, the fingerprint sensor structured to capture a fingerprint from an authorized user, and wherein the at least one use data characteristic of the smoking action is captured only if the authorized user is detected.

10. The product use and behavior instrument of claim 1, wherein the controller further comprises a toggle button, the toggle button structured to alter operation of at least one of the sensor circuit, the local memory, or the communication interface.

11. The product use and behavior instrument of claim 1, wherein the at least one use data characteristic of the smoking action includes an identifier, the identifier including at least one of a clinical data type, a non-clinical data type, or a user identifier.

12. The product use and behavior instrument of claim 1, wherein the local memory is structured to store the buffered at least one data characteristic of the smoking action, and wherein the communication interface is structured to communicate the at least one use data characteristic of the smoking action stored in the local memory to a receiving computing system when the product use and behavior instrument is within range of the receiving computing system.

13. The product use and behavior instrument of claim 1, further comprising a power source configured to provide power to the controller.

14. The product use and behavior instrument of claim 1, further comprising a pressure sensor operably connected to the controller, the pressure sensor configured to measure at least one of a flow of air through the housing or insertion state of the combustible smoking article holder.

15. The product use and behavior instrument of claim 1, further comprising a solid state battery configured to provide power to the controller and receive power from a power source to recharge the solid state battery.

16. The product use and behavior instrument of claim 1, wherein the controller further comprises a location sensor circuit, the location sensor circuit structured to provide information regarding positioning and orientation during the smoking action.

17. The product use and behavior instrument of claim 1, wherein the sensor circuit is caused to collect the at least one use data characteristic, by detection of a change in ambient temperature within the product use and behavior instrument.

18. A combustible smoking article assembly, comprising:
a combustible smoking article comprising:
a first end;
a second end; and
a body extending from the first end axially toward the second end, the body comprising a combustible product; and
a product use and behavior instrument comprising:
a housing comprising a first housing end defining an integral combustible smoking article holder configured to receive the first end of the combustible smoking article, and the housing comprising a second housing end comprising a hollow flow member; and
a controller positioned within the housing, the controller comprising:
a sensor circuit caused to collect at least one use data characteristic of a smoking action, wherein the smoking action is associated with use of the combustible smoking article;
local memory structured to buffer the at least one use data characteristic of the smoking action; and
a communication interface structured to communicate the at least one use data characteristic of the smoking action to a remote computing device,
wherein the first housing end of the housing further defines a recessed portion including a shroud comprising a shroud surface and a shroud wall, the shroud wall extending axially away from the second housing end and the shroud surface, the shroud configured to receive a loose combustible smoking material, and wherein the combustible smoking article holder is disposed within the shroud surface.

19. The combustible smoking article assembly of claim 18, further comprising a holder extending from the housing.

20. The combustible smoking article assembly of claim 18, wherein the controller defines a flow orifice extending through the controller, the flow orifice configured to place the combustible smoking article holder in fluid communication with the hollow flow member, and thereby facilitate air flow from the combustible smoking article holder to the hollow flow member.

21. The combustible smoking article assembly of claim 20, wherein the controller further comprises a light emitting diode and detector, the light emitting diode disposed on an a first side of the flow orifice and the detector disposed on a second side of the flow orifice, the detector configured to capture light from the light emitting diode such that the light captured is associated with a density of aerosol flowing through the flow orifice.

22. The combustible smoking article assembly of claim 18, wherein the sensor circuit is caused to collect the at least one use data characteristic, by detection of a change in ambient temperature within the product use and behavior instrument.

* * * * *

UNITED STATES PATENT AND TRADEMARK OFFICE
CERTIFICATE OF CORRECTION

PATENT NO. : 12,245,629 B2
APPLICATION NO. : 16/131785
DATED : March 11, 2025
INVENTOR(S) : Jeffrey Sean Smith et al.

Page 1 of 1

It is certified that error appears in the above-identified patent and that said Letters Patent is hereby corrected as shown below:

In the Claims

In Column 17, Claim 4, Line 19, "on an a first" should read as -- on a first --

In Column 18, Claim 21, Line 65, "on an a first" should read as -- on a first --

Signed and Sealed this
Tenth Day of June, 2025

Coke Morgan Stewart
*Acting Director of the United States Patent and Trademark Office*